United States Patent [19]

Goodhall

[11] Patent Number: 4,471,986
[45] Date of Patent: Sep. 18, 1984

[54] BUS TOW SLING

[76] Inventor: Wallace I. Goodhall, 2 Mashapaug Rd., Stafford Springs, Conn. 06076

[21] Appl. No.: 370,827

[22] Filed: Apr. 22, 1982

[51] Int. Cl.$^3$ ............................................. B60P 3/12
[52] U.S. Cl. .............................. 294/82 AH; 280/402; 280/491 R
[58] Field of Search ................. 294/82 AH; 280/402, 280/491 R, 492, 493, 494, 480, 495, 562, 491 E; 414/563

[56] References Cited

U.S. PATENT DOCUMENTS 3,154,204 10/1964 La Venture ......................... 280/402
3,501,169 3/1970 Nutt, Jr. ........................... 280/491 R
3,858,734 1/1975 Holmes .......................... 294/82 AH Primary Examiner—James B. Marbert
Attorney, Agent, or Firm—Prutzman, Kalb, Chilton & Alix

[57] ABSTRACT

A tow sling for towing a bus comprising an angular head gear adapted to be secured to the tow bar of a tow truck. The angular head gear is provided with a pair of spaced apart slots each adapted to receive one end of an H-iron. Each of the H-irons are provided on their other end with hooks for securing the tow sling to the undercarriage of the bus. Additional anchors are provided intermediate the hooks and the end of the H-iron secured in the slots of the head gear.

3 Claims, 2 Drawing Figures

U.S. Patent    Sep. 18, 1984    4,471,986
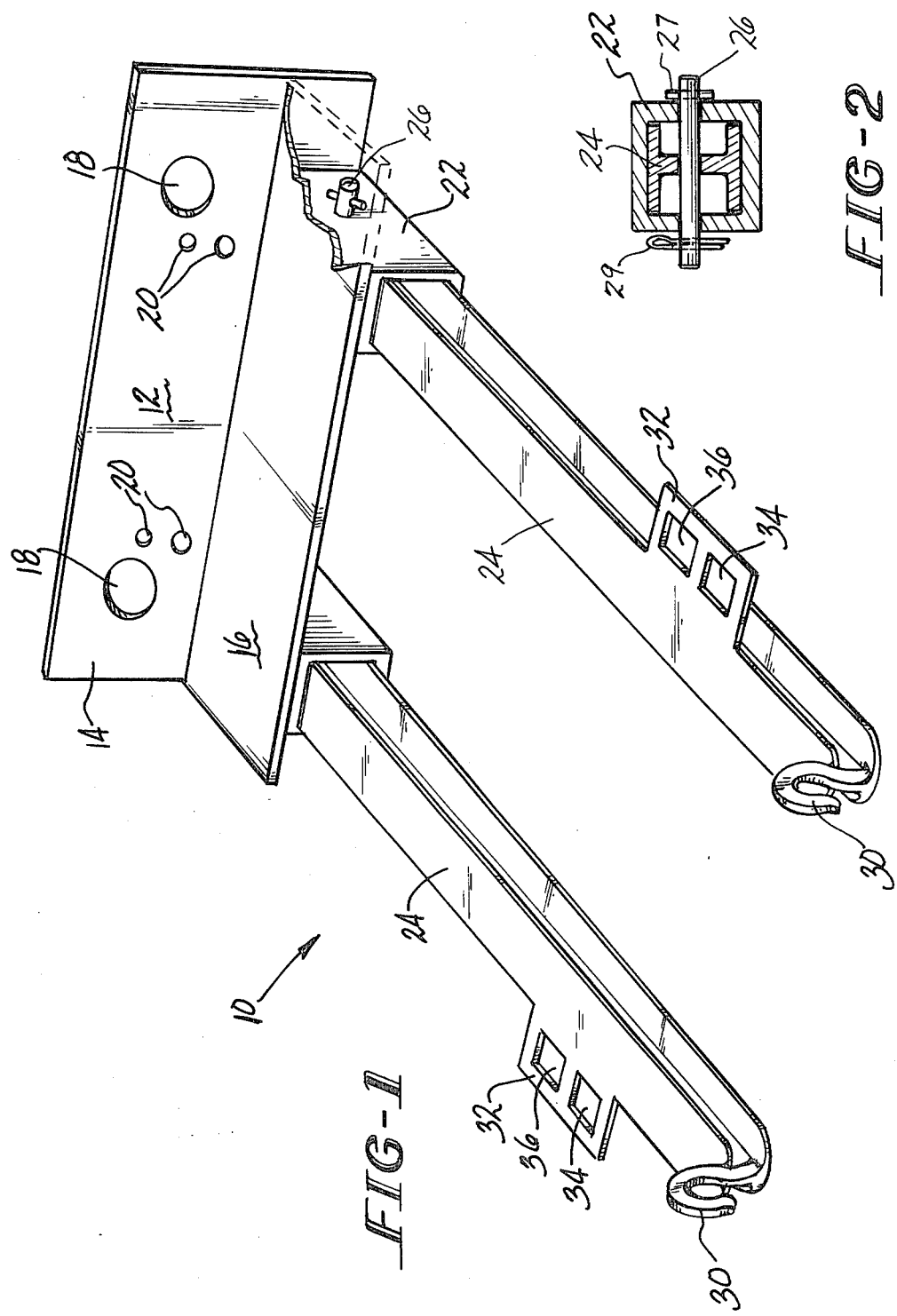

BUS TOW SLING

BACKGROUND OF THE INVENTION

The present invention is drawn to a device used for towing disabled buses and more particularly a bus towing sling comprising an angular head gear having a pair of H-irons projecting therefrom. The H-irons are provided with means for securing the tow sling to the undercarriage of the bus. The head gear is secured to the tow bar on the tow truck.

Heretofore, when tow trucks (wreckers) were called upon to tow disabled buses, chains were used to secure the undercarriage of the bus to the tow bar of the wrecker. There has been a significant problem with damage being done to the front end of the bus frame as a result of the chains slipping and bending the bus frame. Naturally, it would be highly desirable to design a device for towing disabled buses which would eliminate the above-noted problems.

Accordingly, it is the principal object of the present invention to provide a device for use in towing of disabled buses which protects the body frame of the bus from damage.

It is a particular object of the present invention to provide a tow sling having a flat portion on which the frame of the bus may rest.

It is a further object of the present invention to provide a tow sling having means thereon for securing the sling to the undercarriage of the bus to be towed.

Further objects and advantages of the present invention will appear hereinbelow.

SUMMARY OF THE INVENTION

In accordance with the present invention, the foregoing objects and advantages are readily obtained.

The present invention comprises a tow sling having a head gear portion provided with a plurality of orifices for securing the tow sling to the tow bar of a wrecker. The head gear is provided with a support plate for supporting the front frame of a bus to be towed. A pair of H-irons secured to slots provided on the head gear project therefrom and include means for securing the undercarriage of the bus to the tow sling. By providing a tow sling as set forth above, disabled buses are able to be towed by wreckers without any damage to their frames as a result of contact with and slippage of towing chains.

BRIEF DESCRIPTION OF THE DRAWINGS

FIG. 1 is a schematic representation of the bus tow sling in accordance with the present invention.

FIG. 2 is a detailed view of the means for securing the H-irons in place.

DETAILED DESCRIPTION

Referring to FIG. 1, the tow sling 10 of the present invention consists of a head gear portion 12 comprising a head plate 14 and a base plate 16 extending substantially perpendicular from the head plate 14. The base plate 16 may be secured to the head plate 14 by any suitable means such as welding or may be made integral therewith. The head plate 14 is provided with two orifices 18 for securing the head plate 14 of the head gear 12 to the tow bar of a wrecker. Additional orifices 20 may be provided in the head plate 14 so as to provide additional means for securing the head gear 12 to the tow bar of the wrecker. Provided on the underside of the base plate 16 and secured thereto by welding are two spaced apart slots 22 each adapted to receive one end of the H-irons 24. The head plate 14 may extend, if desired, below the underside of base plate 16 in order to further support the slots 22. The slots 22 may be connected to the base plate 16 and the head plate 14 by welding. The H-irons 24 are secured within the slots 22 by means of a pin 26 which extends through holes provided in both side walls of the slots 22 and a corresponding hole provided in each of the H-irons. The pin 26 is provided with a stop means 27 on one end thereof and is held in place in the holes provided in the H-irons 24 and the side walls of slots 22 by means of a cotter pin 29 which projects through a hole on the other end of the securing pin 26 opposite the stop. On the end of each H-iron remote from the head gear 12 is a hook 30 for securing the tow sling to the undercarriage of the bus. Intermediate the hook 30 and the head gear 12 on each of the H-irons 24 is a flange 32 having a pair of cutouts 34 and 36 for securing the tow sling 10 to the undercarriage of the bus in a manner to be made clear hereinbelow.

The undercarriage of the bus is secured to the tow sling in the following manner. The tow sling is located under the undercarriage of the bus so that the head plate 14 is located a few inches from the front end of the bus. The H-irons 24 project between the wheels of the bus. Chains having hooks on either end thereof are passed through the openings 34 in the flanges 32 and are wrapped around the torsion bar of the undercarriage of the bus so as to draw the tow sling flush therewith. The hooks on the ends of the chains are thereafter secured to the chains themselves. Similarly, chains are passed through openings 36 in flange 32 for securing the tow sling to the axle of the bus. The hooks 30 are also secured to the axle of the bus by means of chains. The head plate 14 is secured to the tow bar of the wrecker and the tow sling is elevated so as to lift the front end of the bus off the ground. The fact that the frame of the bus rests on the base plate 16 of the head gear and is not in contact with any chains eliminates the possibility of damage thereto. The top surface of the base plate 16 may be provided with suitable material to avoid metal-to-metal contact between the base plate and the front end of the bus. Suitable materials would include wood, plastic and the like.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A tow sling for use in towing buses comprising:
   a head gear portion comprising a head plate including a plurality of openings, a base plate extending perpendicularly to the head plate and adaptable for supporting the frame of a towed bus, and a pair of spaced slot means;
   a pair of support beams having one end receivable in a slot means and removeably securable to said head gear portion to extend in a parallel spaced relationship generally perpendicular to said head plate;

a pair of hooks, each said hook extending from a said support beam at an end remote from said head gear; and a pair of flange portions extending from a said support beam, each flange portion being disposed intermediate said hooks and head gear portion and including at least one opening.

2. The tow sling of claim 1 wherein each said hook extends in a generally upright orientation relative to said support beam and is adaptable for central engagement from an outer downward location.

3. The tow sling of claim 1 wherein each said support beam has an H-shaped cross-section and is securable in a said slot means by a pin received in aligned openings of said beam and slot means.

* * * * *